(12) United States Patent
Nygren et al.

(10) Patent No.: US 7,027,708 B2
(45) Date of Patent: Apr. 11, 2006

(54) SYSTEM AND METHOD FOR REPRODUCING A VIDEO SESSION USING ACCELERATED FRAME PLAYBACK

(75) Inventors: Blair E. Nygren, Lewisville, TX (US); Jonathan B. Hart, Atlanta, GA (US); Abhay S. Shah, Irving, TX (US)

(73) Assignee: eTalk Corporation, Irving, TX (US)

( * ) Notice: Subject to any disclaimer, the term of this patent is extended or adjusted under 35 U.S.C. 154(b) by 1048 days.

(21) Appl. No.: 09/751,039

(22) Filed: Dec. 29, 2000

(65) Prior Publication Data

US 2002/0106190 A1    Aug. 8, 2002

(51) Int. Cl.
*H04N 5/91* (2006.01)

(52) U.S. Cl. .......................................... 386/46; 386/125

(58) Field of Classification Search ................... 386/39, 386/46, 68–70, 81, 82, 125, 126; 348/552, 348/14.08; 379/112.01, 30; 382/166; 725/88–90, 725/134; 375/240.21
See application file for complete search history.

(56) References Cited

U.S. PATENT DOCUMENTS

| | | | | |
|---|---|---|---|---|
| 4,305,131 A | * | 12/1981 | Best | ............................. 386/39 |
| 5,014,125 A | * | 5/1991 | Pocock et al. | ............... 348/484 |
| 5,050,230 A | * | 9/1991 | Jones et al. | .................. 382/166 |
| 5,535,256 A | * | 7/1996 | Maloney et al. | ............. 379/309 |
| 5,991,373 A | * | 11/1999 | Pattison et al. | ........... 348/14.08 |
| 6,625,389 B1 | * | 9/2003 | Leyvi | ........................... 386/52 |
| 6,826,775 B1 | * | 11/2004 | Howe et al. | ................. 348/563 |

OTHER PUBLICATIONS

U.S. Appl. No. 09/751,038, entitled "System and Method for Reproducing a Video Session Using Accelerated Frame Recording," filed Dec. 29, 2000 with drawings, 62 total pages.

\* cited by examiner

*Primary Examiner*—James J. Groody
*Assistant Examiner*—Christopher Onuaku
(74) *Attorney, Agent, or Firm*—Baker Botts L.L.P.

(57) ABSTRACT

A client for reproducing a video session includes a memory and a processor coupled to the memory. The memory stores a first video frame that includes first video data, a first video sub-frame comprising second video data that is different from the first video data, and a second video sub-frame comprising third video data. The processor generates a second video frame using the first video frame and the first video sub-frame, wherein the third video data is different from the video data of the second video frame. The processor further generates a third video frame using the second video frame and the second video sub-frame, and displays the first video frame.

24 Claims, 7 Drawing Sheets

| SESSION ID | SEGMENT TYPE | OFFSET | SEGMENT ID | PATH |
|---|---|---|---|---|
| 5 | VOICE | 50 | 12 | f:\voice\5010197.dat |
| 5 | VOICE (KEY FRAME) | 100 | 14 | video5@server |
| 5 | VOICE | 100 | 15 | http:\\voiceann5.cti |
| 5 | VIDEO (SUB-FRAME) | 25 | 2 | video.bigco.1324 |
| 3 | VIDEO (SUB-FRAME) | 300 | 9 | c:\video\3.dat |
| 3 | VOICE | 325 | 8 | c:\voice\3.dat |
| ⋮ | ⋮ | ⋮ | ⋮ | ⋮ |

SYSTEM AND METHOD FOR REPRODUCING A VIDEO SESSION USING ACCELERATED FRAME PLAYBACK

CROSS-REFERENCE TO RELATED APPLICATIONS

This application is related to and filed concurrently with pending U.S. patent application Ser. No. 09/751,038, entitled "System and Method for Reproducing a Video Session Using Accelerated Frame Recording." These applications have been commonly assigned to e-talk Corporation.

TECHNICAL FIELD OF THE INVENTION

This invention relates generally to communication systems, and more particularly to a system for reproducing a video session using accelerated frame playback.

BACKGROUND OF THE INVENTION

Call centers provide a wide array of services through sessions that include both a voice segment and a video segment. In a particular session, a call center service representative engages in voice communication with a customer to produce a voice segment, and may also generate, retrieve, or manipulate information on a computer display to produce an associated video segment. The combination of the voice segment and associated video segment together provide a record of the session.

In a call center environment, it is important to record a voice and video session performed by a service agent without alerting the service agent that such recording is taking place. Otherwise, the integrity of the session may be compromised. A service agent is generally alerted to the monitoring of his performance when the processing capacity and/or memory resources of his computer are exceeded, causing the computer to operate slowly or in some other noticeably abnormal manner. It is also important, however, to record, store, and communicate voice and video data efficiently so that the reproduction of the voice and video sessions is effective and robust. This is particularly true for a data intensive video session.

SUMMARY OF THE INVENTION

In accordance with the present invention, a system and method for reproducing a video session using accelerated frame recording and playback are provided that substantially eliminate or reduce disadvantages or problems associated with previously developed communication systems and methods.

In one embodiment of the present invention, a system for recording a video session includes a video server and a client coupled to the video server using a communication path. The video server communicates a start record command. The client determines the processing capacity of the client and establishes a recording interval in response to the determined processing capacity. The recording interval indicates a time between a first recording time and a second recording time. The client records a first video frame at the first recording time in response to the start record command. The first video frame includes first video data. The client further records a second video frame at the second recording time. The second video frame includes second video data. The client generates a video sub-frame comprising the second video data that is different from the first video data.

In another embodiment of the present invention, a method for recording a video session at a client includes determining the processing capacity of the client and establishing a recording interval in response to the determined processing capacity. The recording interval indicates a time between a first recording time and a second recording time. The method continues by recording a first video frame at the first recording time and recording a second video frame at the second recording time. The first video frame includes first video data and the second video frame includes second video data. The method concludes by generating a video sub-frame comprising the second video data that is different from the first video data.

In yet another embodiment of the present invention, a method for reproducing a video session includes storing a first video frame that includes first video data and storing a first video sub-frame comprising second video data that is different from the first video data. The method continues by generating a second video frame using the first video frame and the first video sub-frame. The method continues by storing a second video sub-frame comprising third video data that is different from the video data of the second video frame. The method concludes by generating a third video frame using the second video frame and a second video sub-frame and by displaying the first video frame.

Depending on the specific features implemented, particular embodiments of the present invention may exhibit some, none, or all of the following technical advantages. One aspect of the present invention provides an arrangement of a voice server, video server, and clients (e.g., agent workstation, supervisor workstation) that allows recording and reproduction of voice and video sessions performed by a service agent. The system communicates the video segment and associated system commands using a local area network (LAN), and the voice segment using voice paths established by an automatic call distributor (ACD), private branch exchange (PBX), or other telecommunications switch of the call center.

The computer of an agent workstation performs various techniques to process the video data that is captured during a video session in order to record, store, and communicate video data efficiently while preserving the integrity of the video session by keeping the service agent unaware that the video session is being recorded. To do this, the computer of the agent workstation generally determines its own processing capacity and memory resources and processes the video data of the video session accordingly. The video data is generally processed such that video data for a particular video segment comprises a complete image or screen dump. Such a video segment is referred to as a key frame. Subsequent video segments include video data that represents changes to the displayed information. Such a video segment is referred to as a video sub-frame.

In addition to recording the video data of a video session, a technical advantage of the present invention is that the video data may be processed to reproduce the video session. A particular advantage of the present invention is the use of key frames and video sub-frames to generate video frames that are displayed to reproduce the video session. By using key frames and video sub-frames, the processor of a supervisor workstation may generate video frames at intermediate points of a video session rather than having to generate each video frame from the beginning of the video session all the way to a position within the video session from which the reproduction of the video session is actually desired. The use of key frames and video sub-frames therefore facilitates an efficient and faster reproduction of the video session, and allows a particular video session to be rewinded and/or fast forwarded to a particular position in the video session.

Other technical advantages are readily apparent from one skilled in the art from the following figures, descriptions, and claims.

BRIEF DESCRIPTION OF THE DRAWINGS

For a more a complete understanding of the present invention and its advantages, reference is now made to the following descriptions, taken in conjunction with the accompanying drawings, in which.

DETAILED DESCRIPTION OF THE INVENTION

Figure 1:
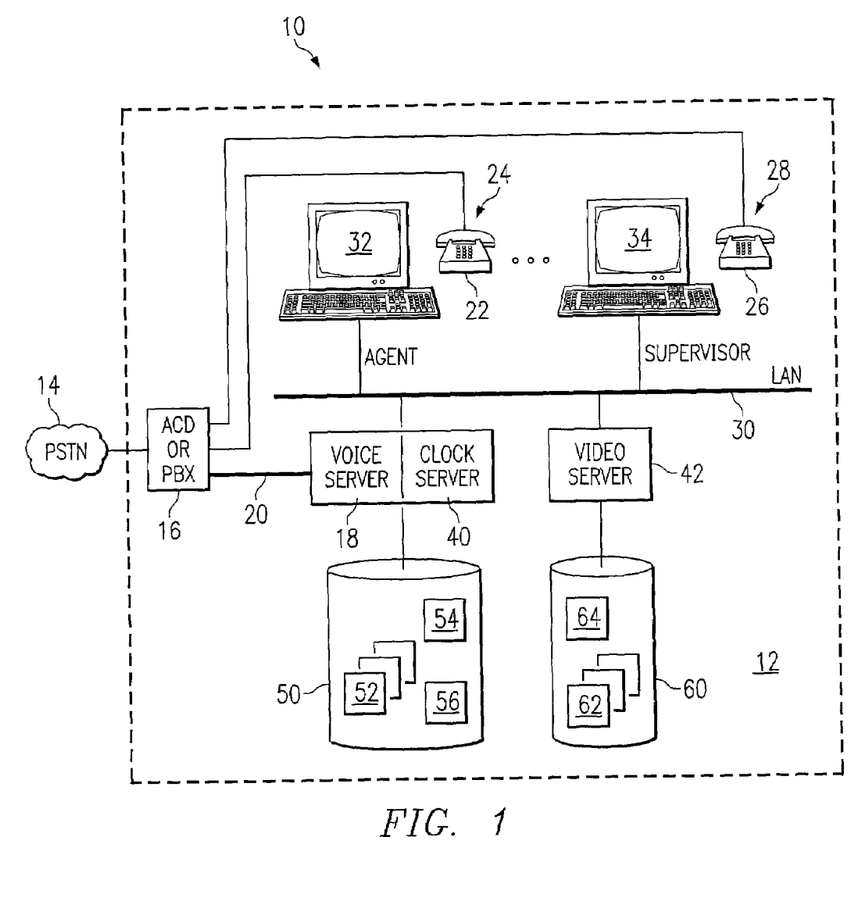
FIG. 1 illustrates a communication system for reproducing a voice session and a video session in accordance with the present invention.

FIG. 1 illustrates a communication system 10 that includes a call center 12 coupled to the public switched telephone network (PSTN) or other switched or dedicated communication facility that can establish sessions with call center 12, which is referred to generally as PSTN 14. In general, call center 12 provides a wide array of services through sessions that include both a voice segment and a video segment. The components of call center 12 provide various functions and features that allow recording and faithful reproduction of the sessions.

Call center 12 includes an automatic call distributor (ACD), a private branch exchange (PBX), or other telecommunications switch 16 coupled to a voice server 18 using lines 20. Switch 16 is also coupled to a voice instrument 22 at agent workstation 24 and a voice instrument 26 at supervisor workstation 28. Voice instruments 22 and 26 terminate voice paths established from voice server 18 via switch 16.

A local area network (LAN) 30 couples the voice server 18 to a computer 32 at agent workstation 24 and a computer 34 at supervisor workstation 28. Computers 32 and 34 may be referred to generally as computers 32, and may include a real-time clock, a processor, volatile and non-volatile memory (RAM, ROM, CD-ROM, optical disk, etc.), a display, a mouse, a keyboard and other suitable input/output devices. Workstations 24 and 28 and/or computers 32 and 34 may be referred to generally as clients.

LAN 30 is also coupled to a clock server 40 and a video server 42. Generally, LAN 30 may represent a local area network, wide area network, or other communication network that supports communication of data between voice server 18, clock server 40, video server 42, and computers 32 and 34. Clock server 40 may comprise a software routine and/or hardware component that is integral to or separate from voice server 18. Voice server 18 refers to voice server 18 alone or in combination with clock server 40.

Voice server 18 maintains a database 50 that stores voice segments 52, an offset table 54, scheduling criteria 56, and any other suitable information or data to faithfully record and reproduce a voice session that is synchronized with an associated video session. U.S. Pat. No. 5,535,256 entitled "Method and System for Automatically Monitoring the Performance Quality of Call Service Representatives" discloses various techniques for scheduling and recording voice segments, and is hereby incorporated by reference for all purposes. Pending U.S. patent application Ser. No. 08/929,490, entitled "Reproduction of a Voice and Video Session" discloses various techniques for the synchronized recording and reproduction of voice and video sessions, and is hereby incorporated by reference for all purposes. Video server 42 maintains a database 60 that stores video segments 62 and a segment table 64, as described below in more detail with reference to FIG. 2.

Although communication system 10 illustrates one agent workstation 24 and one supervisor workstation 28, it is understood that call center 12 may include numerous agent workstations 24 and supervisor workstations 28. Moreover, call center 12 may include one or more switches 16, voice servers 18, clock servers 40, and video servers 42 depending on the particular design, capacity, and implementation details of communication system 10. Databases 50 and 60 may be implemented in one or more separate databases accessed locally or remotely by voice server 18 and video server 42.

In operation, switch 16 initiates a voice session at call center 12 in response to receiving a call from PSTN 14. Switch 16 transfers the call to voice instrument 22 of agent workstation 24. Depending on the satisfaction of a variety of scheduling criteria, switch 16 may establish a connection using lines 20 so that voice server 18 may record a voice segment 52 associated with the voice session.

Video server 42 initiates a video session to complement the voice session recorded by voice server 18. In one embodiment, voice server 18 notifies video server 42 that a voice session has been initiated with a particular agent workstation 24. For example, the notification may include a network address associated with the computer 32 of the particular agent workstation (e.g., an IP address), a start time of the voice session, or any other suitable information associated with the voice session or computer 32. In response, video server 42 communicates to computer 32 of the particular agent workstation 24 commands that instruct computer 32 to start recording the video session. At the appropriate time independently determined by video server 42 or upon receiving commands from voice server 18, video server 42 instructs computer 32 to stop recording the video session.

During the video session, computer 32 at agent workstation 24 generates video data regarding the session, either automatically or as a result of user activity. In particular, computer 32 captures screen shots, screen display and/or draw commands, or other video data. Computer 32 processes the video data prior to communicating the video data as video segments 62 to video server 42 using LAN 30. Video server 42 stores video segments 62 in database 60. As voice server 18 and video server 42 store voice segments 52 and video segments 62, respectively, system 10 updates segment table 64 with information on sessions and their associated voice and video segments.

Call center 12 also allows playback or reproduction of a session previously handled and recorded by call center 12. To perform this operation, a supervisor operating computer 34 at supervisor workstation 28 selects a session to reproduce or monitor. Computer 34 then requests one or more associated video segments 62 stored in database 60 maintained by video server 42. Also, computer 34 requests establishment of a voice path from voice server 18 to voice instrument 26 via switch 16 that allows voice server 18 to play one or more voice segments 52 associated with the chosen session. At the appropriate queue, and optionally using clock offsets stored in offset table 54, computer 34 and voice instrument 26 concurrently communicate video segments 62 and voice segments 52, respectively, to reproduce the chosen session.

In a call center environment, it is important to record a voice and video session performed by a service agent without alerting the service agent that such recording is taking place. Otherwise, the integrity of the session may be compromised. A service agent is generally alerted to the monitoring of his performance when the processing capacity and/or memory resources of his computer 32 are exceeded, causing the computer 32 to operate slowly or in some other noticeably abnormal manner. It is also important, however, to record, store, and communicate voice and video data efficiently so that the reproduction of the voice and video sessions is effective and robust. This is particularly true for the data intensive video session.

Figure 2:
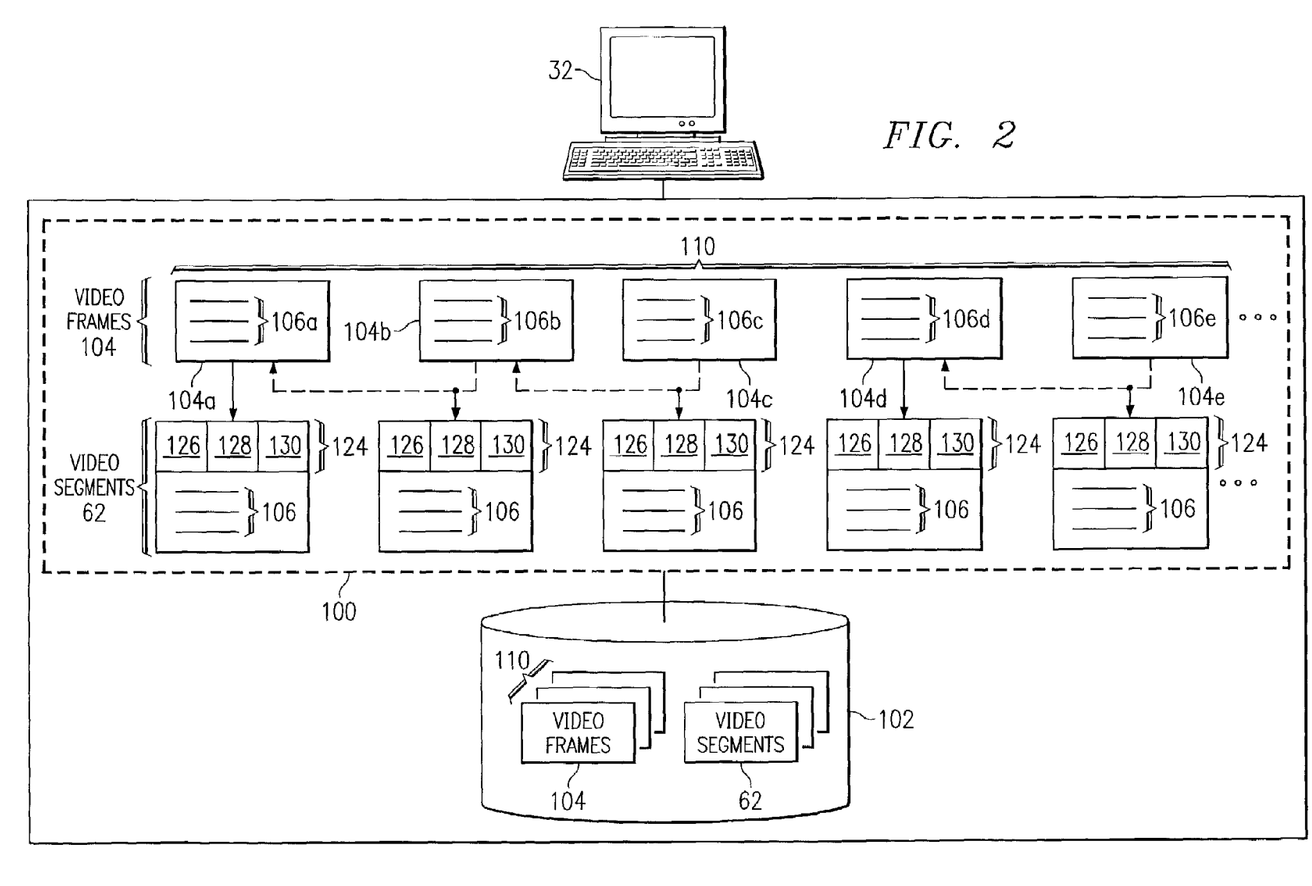
FIG. 2 illustrates one embodiment of a computer associated with an agent workstation of the system.

Computer 32 performs various techniques, described in greater detail with respect to FIG. 2, to process the video data that is captured during a video session in order to record, store, and communicate video data efficiently while preserving the integrity of the video session by keeping the service agent unaware that the video session is being recorded. To do this, computer 32 generally determines its own processing capacity and memory resources and processes the video data of the video session accordingly.

FIG. 2 illustrates one embodiment of computer 32 associated with agent workstation 24. Computer 32 includes a processor 100 coupled to a memory 102. In general, processor 100 comprises a central processing unit while memory 102 comprises any suitable organization of volatile or non-volatile memory that stores video frames 104 captured by processor 100 and video segments 62 generated by processor 100 using video frames 104.

Processor 100 records video frames 104 starting with video frame 104a at recording time $t_1$, upon, for example, receiving a "start record" command from video server 42 or receiving some other appropriate control signal. Each video frame 104 comprises video data 106 that represents screen shots, bit-mapped information, screen display and/or draw commands, video activity, or any other form of visual information that represents text, graphics, or mouse movements associated with a display of computer 32. Processor 100 records each subsequent video frame 104b–104e at a subsequent recording time, $t_2$–$t_5$, respectively, in response to a recording interval 108. Recording interval 108 comprises the time between each video frame 104 that is recorded by processor 100. Therefore, the recording interval 108 comprises the time between a first recording time, $t_n$, and a second recording time, $t_{n+1}$. For example, the recording interval 108 may be established to be five-hundred milliseconds so that processor 100 records two video frames 104 per second of an associated video session. Although FIG. 2 is illustrated with video frames 104a–e, it should be understood that processor 100 records additional video frames 104 until receiving a "stop record" command from video server 42, or until receiving some other appropriate control signal.

In one embodiment, recording interval 108 is determined in response to the processing capacity of processor 100, such as the computational throughput of processor 100 (e.g., the number of instructions executed per clock cycle). As described below, processor 100 processes video frames 104 to generate video segments 62. This process may utilize a significant portion of the processing capacity of processor 100. As the recording interval 108 becomes smaller, processor 100 is called upon to process additional video frames 104 per second thereby increasing the granularity of the video session. If recording interval 108 becomes too small, however, processor 100 may exceed its processing capacity such that processor 100 operates in a noticeably abnormal manner. This may alert the service agent that a particular video session is being recorded. Therefore, a particular advantage of the present invention is that the processing capacity of processor 100 is determined by processor 100, supervisor workstation 28, or any other suitable component of call center 12, and processor 100 dynamically establishes a recording interval 108 in response to the determined processing capacity such that processor 100 does not exceed its own processing capacity while generating video segments 62 from video frames 104.

For example, if the processing capacity of processor 100 is low, processor 100 establishes a recording interval 108 that is large (e.g., two to three seconds) so that a fewer number of video frames 104 are processed during a video session. If the processing capacity of processor 100 is high, processor 100 establishes a recording interval 108 that is small (e.g., five hundred milliseconds to one second) so that a greater number of video frames 104 are processed during the video session.

As the processing capacity of processor 100 may vary from time to time, the processing capacity of processor 100 may be repeatedly determined during a session such that the recording interval 108 may be adjusted dynamically. In this regard, processor 100 achieves the highest level of granularity for the video session without alerting the service agent as to the recording of a video session, thereby preserving the integrity of the video session.

As processor 100 records video frames 104, memory 102 stores video frames 104 in a queue 110. As processor 100 records video frames 104 and stores them in queue 110 memory 102, the available memory resources of computer 32 are reduced. If queue 110 is filled with so many video frames 104 that the available memory resources of computer 32 are reduced below a predetermined threshold, then computer 32 may begin to operate in a noticeably abnormal manner, thereby alerting the service agent that the video session is being recorded. A technical advantage of the present invention is that the available memory resources of computer 32 are determined by processor 100, supervisor workstation 28, or any other suitable component of call center 12, and processor 100 manages the size and capacity of queue 110 such that a service agent operating computer 32 remains unaware that a particular video session is being recorded. To do this, processor 100 establishes one or more thresholds for the available memory resources of computer 32. For example, processor 100 may establish appropriate thresholds for each of the access time and/or bandwidth of memory 102. If the size and/or capacity of queue 110 causes the available memory resources of computer 32 to fall below the established threshold(s), processor 100 removes a selected one or more of video frames 104 from queue 110 to make room for additional video frames 104.

Upon recording video frames 104 and storing them in queue 110 of memory 102, processor 100 generates video segments 62. Video segments 62 may comprise key frames 120 or video sub-frames 122. In general, each video segment 62 includes a header 124 that contains a type identifier 126, a segment identifier 128, and an offset or timestamp 130. Type identifier 126 indicates whether the particular video segment 62 is a key frame 120 or a video sub-frame 122. Segment identifier 128 comprises a unique identifier of the particular video segment 62 in a video session. Offset or timestamp 130 indicates a time interval, an absolute measure of time, a time difference from the beginning of a session, or some other indicator of time associated with the particular video segment 62 within the video session. Header 124 may also include other information associated with video segment 62, such as length and size information, compression information, error correction and recovery information, framing information, and any other information suitable to maintain and access video segments 62 in database 60. Components of header 124 may be before, after, or interspersed with video data 106.

A key frame 120 comprises a type of video segment 62 having video data 106 that includes all of the video data 106 of a corresponding video frame 104. For example, video segment 62a comprises a key frame 120 having video data 106 that includes all of the video data 106 from video frame 104a. Similarly, video segment 62d comprises a key frame 120 having video data 106 that includes all of the video data 106 from video frame 104d. In this regard, the video data 106 of a key frame 120 comprises a complete image or screen dump of an associated video frame 104.

A video sub-frame 122 comprises a type of video segment 62 having video data 106 that is generated using the video data 106 of multiple video frames 104. For example, video segment 62b comprises a video sub-frame 122 having video data 106 that is generated by comparing the video data 106 of video frame 104b with the video data 106 of video frame 104a. As described in greater detail with reference to FIGS. 3A and 3B, the video data 106 of a video sub-frame 122, such as video segment 62b, comprises the video data 106 of video frame 104b that is different from video data 106 of video frame 104a. In this regard, the video data 106 of a video sub-frame 122 represents changes to the displayed information with respect to a complete image formed by a prior key frame 120 and any intervening video sub-frames 122. Therefore, the video data 106 of video segment 62b, which is a video sub-frame 122, represents the changes to the displayed information with respect to the complete image or screen dump associated with video data 106 of video segment 62a, which is a key frame 120.

Video segment 62c comprises a video sub-frame 122 having video data 106 comprising the video data 106c that is different from video data 106b. In this regard, the video data 106 of video segment 62c, which is a video sub-frame 122, represents the changes to the displayed information with respect to the complete image or screen dump formed by the video data 106 of video segment 62a, which is a key frame 120, and the video data 106 of video segment 62b, which is an intervening video sub-frame 122. Video segment 62e comprises a video sub-frame 122 having video data 106 comprising the video data 106e that is different from video data 106d. In this regard, the video data 106 of video segment 62e, which is a video sub-frame 122, represents the changes to the displayed information with respect to the complete image or screen dump formed by the video data 106 of video segment 62d, which is a key frame 120. Therefore, different video sub-frames 122 may represent changes to displayed information with respect to the complete image or screen dump formed by the video data 106 of prior key frames 120 and any intervening video sub-frames 122. As will be discussed in greater detail with reference to the playback of video sessions described in FIG. 5, the use of key frames 120 and video sub-frames 122 facilitates the efficient reproduction of a video session using a rewind command and a fast forward command.

Upon generating video segments 62 from video frames 104, processor 100 removes particular video frames 104 from queue 110. For example, upon generating video segment 62b from the video data 106 associated with video frames 104a and 104b, processor 100 removes video frame 104a from queue 110 of memory 102. Similarly, upon generating video segment 62c from the video data 106 associated with video frames 104b and 104c, processor 100 removes video frame 104b from queue 110 of memory 102. In this regard, processor 100 makes available additional memory resources to store later recorded video frames 104.

Upon recording video frames 104 and generating video segments 62, processor 100 compresses video segments 62 using any suitable compression techniques. Each compressed video segment 62 is then communicated to video server 42 for storing and subsequent reproduction. Processor 100 may compress and communicate video segments 62 to video server 42 both during the video session or after the video session is completed, depending upon network traffic conditions, the particular data communication techniques employed by processor 100, or any other suitable factor associated with call center 12. For example, processor 100 may compress and communicate one or more video segments 62 while processor 100 is simultaneously performing the tasks of recording additional video frames 104 and processing video segments 62. In this regard, processor 100 compresses and communicates video segments 62 during a video session. In another example, processor 100 completes the task of recording video frames 104 and generating video segments 62 before communicating video segments 62 to video server 42 in one or more "bursts" of data. In this regard, processor 100 compresses and communicates video segments 62 after the video session is completed.

The time interval between the recording of video frames 104 that are used as key frames 120 is referred to as a key frame interval 136. Because key frames 120 comprise video data 106 that represents a complete image or screen dump of a video frame 104, the communication of key frames 120 from computer 32 to a video server 42 is data intensive and uses a larger portion of the capacity associated with a communication path, such as LAN 30, that couples computer 32 to video server 42, than does a video sub-frame 122. To avoid creating bottlenecks in the communication of video segments 62 over LAN 30, processor 100 dynamically establishes a key frame interval 136 in response to the network capacity of LAN 30. For example, if the data traffic over LAN 30 is high so that the network capacity of LAN 30 is low, processor 100 establishes a key frame interval 136 that is large (e.g., one-hundred-twenty to one-hundred-fifty seconds) so that a fewer number of video segments 62 having video data 106 representing a complete image (e.g., a key frame 120) are communicated to video server 42 over LAN 30 during a video session. If the data traffic over LAN 30 is low so that the network capacity of LAN 30 is high, processor 100 establishes a key frame interval 136 that is small (e.g., thirty to sixty seconds) so that a greater number of video segments 62 having video data 106 representing a complete image (e.g., a key frame 120) are communicated to video server 42 over LAN 30 during a video session.

Because the network capacity of LAN 30 depends upon the use of LAN 30 by many peripheral devices, such as voice servers 18, video servers 42, computers 32 and 34, or any other components of call center 12, the network capacity of LAN 30 may change from time to time to reflect the data traffic generated by these components. Therefore, key frame interval 136 may be dynamically changed to represent the changing network capacity of LAN 30. Moreover, it should be understood that in addition to processor 100, other components of call center 12, such as video server 42 or computer 34, may monitor the network capacity of LAN 30 and modify the key frame interval 136 of a particular video session on behalf of computer 100.

In addition, key frame interval 136 may also be dynamically established in response to the processing capacity of processor 100 and/or available memory resources of computer 32. Furthermore, recording interval 108 may also be dynamically established in response to the network capacity of LAN 30.

Figure 3A:
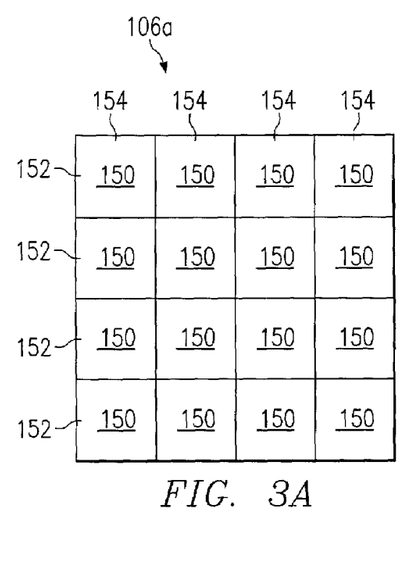
FIGS. 3A and 3B illustrate one embodiment of video data used by a processor of the system to generate a video sub-frame.
Figure 3B:
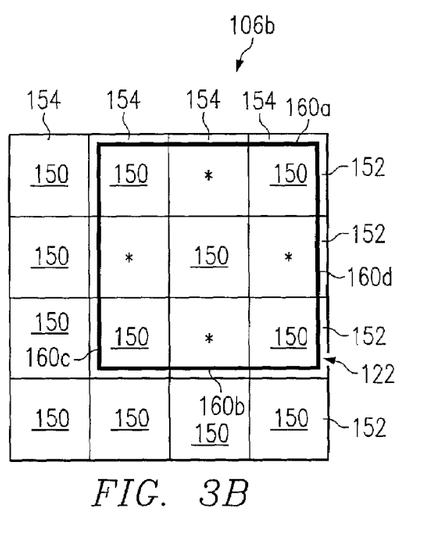

FIGS. 3A and 3B illustrate one embodiment of video data 106a and 106b associated with video frames 104a and 104b, respectively, used by processor 100 to generate a video sub-frame 122. Video data 106a may comprise bitmapped video pixels 150 arranged in rows 152 and columns 154. Video data 106b may similarly comprise bitmapped video pixels 150 arranged in corresponding rows 152 and corresponding columns 154. The video pixels 150 illustrated in FIGS. 3A and 3B are arranged in four rows 152 and four columns 154, but it should be understood that video pixels 150 may be arranged in any suitable number of rows 152 and columns 154.

In operation, processor 100 compares video data 106b with video data 106a to generate a video sub-frame 122 having video data 106 comprising the video data 106b that is different from video data 106a. To do this, in one embodiment, processor 100 sequentially compares each row 152 of video pixels 150 associated with video data 106b with a corresponding row 152 of video pixels 150 associated with video data 106a until identifying a row 152 of video pixels 150 in which video data 106b is different from video data 106a, as indicated using an asterisk.

In a particular embodiment, processor 100 initiates this comparison from the first row 152 of video pixels 150 and simultaneously initiates this comparison from the last row 152 of video pixels 150. Each comparison, the comparison starting with the first row 152 and the comparison starting with the last row 152, is performed until processor 100 identifies a row 152 of video pixels 150 where video data 106b is different from video data 106a. Therefore, the comparison initiated from the first row 152 continues row-by-row from the first row 152 toward the last row 152 until a row 152 is identified where video data 106b is different from video data 106a. Similarly, the comparison initiated from the last row 152 continues row-by-row from the last row 152 toward the first row 152 until a row 152 is identified where video data 106b is different from video data 106a.

As illustrated in FIG. 3B, the first row 152 of video data 106b includes a video pixel 150 that is different from a video pixel 150 of video data 106a, as indicated by the asterisk in the first row 152. This row 152 therefore defines a first boundary 160 of video sub-frame 122. The next to last row 152 of video pixels 150 also includes a video pixel 150 associated with video data 106b that is different from a corresponding video pixel 150 of video data 106a, as indicated by the asterisk in the next to last row 152. This row 152 therefore defines a second boundary 160 of video sub-frame 122.

Similar to the comparison of rows 152, processor 100 sequentially compares each column 154 of video pixels 150 associated with video data 106b with a corresponding column 154 of video pixels 150 associated with video data 106a until identifying a column 154 of video pixels 150 in which video data 106b is different from video data 106a, as indicated using an asterisk. In a particular embodiment, processor 100 initiates this comparison from the first column 154 of video pixels 150 and simultaneously initiates this comparison from the last column 154 of video pixels 150. Each comparison, the comparison starting with the first column 154 and the comparison starting with the last column 154, is performed until processor 100 identifies a column 154 of video pixels 150 where video data 106b is different from video data 106a. Therefore, the comparison initiated from the first column 154 continues column-by-column from the first column 154 toward the last column 154 until a column 154 is identified where video data 106b is different from video data 106a. Similarly, the comparison initiated from the last column 154 continues column-by-column from the last column 154 toward the first column 154 until a column 154 is identified where video data 106b is different from video data 106a.

As illustrated in FIG. 3B, the second column 154 of video data 106b includes a video pixel 150 that is different from a video pixel 150 of video data 106a, as indicated by the asterisk in the second column 154. This column 154 therefore defines a third boundary 160 of video sub-frame 122. The last column 154 of video pixel 150 also includes a video pixel 150 associated with video data 106b that is different from a corresponding video pixel 150 of video data 106a, as indicated by the asterisk in the last column 154. This column 154 therefore defines a fourth boundary 160 of video sub-frame 122.

Video sub-frame 122, defined by boundaries 160, therefore comprises video data 106b that is different from video data 106a. For example, video sub-frame 122 comprises the smallest subset of video data 106b arranged in a rectangle that includes all of the video data 106b that is different from video data 106a. In this regard, video sub-frame 122 includes all of the changes to the video data 106 of a prior video frame 104. Although FIGS. 3A and 3B are described with reference to a particular technique for comparing video data 106b with video data 106a to generate a video sub-frame 122, it should be understood that the present invention contemplates generating a video sub-frame 122 that includes video data 106b that is different from video data 106a using any suitable comparison techniques.

Figure 4:
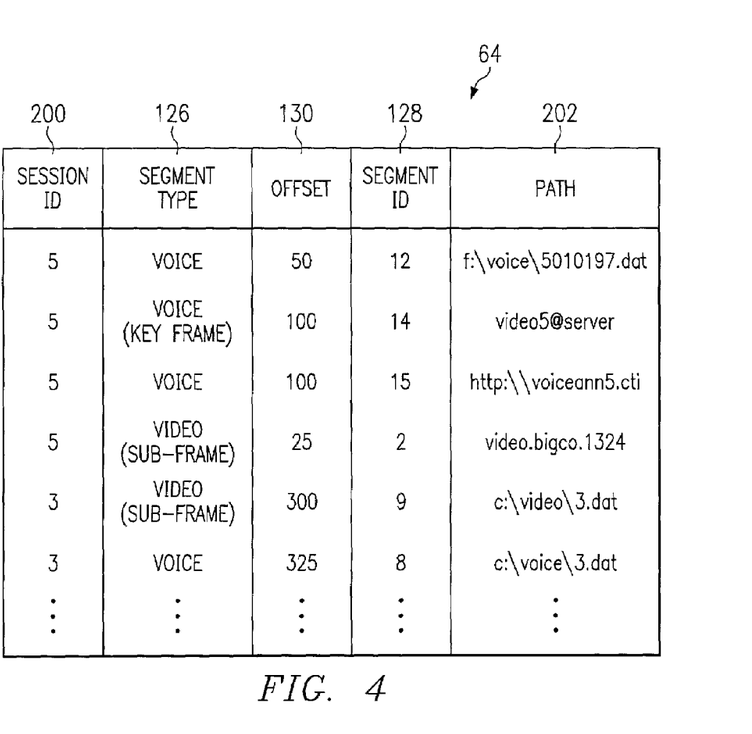
FIG. 4 illustrates a segment table used in the communication system.

FIG. 4 illustrates segment table 64 used in communication system 10. Each entry in segment table 64 corresponds to a session identifier 200. Each entry may correspond to a voice segment 52 or a video segment 62 as indicated by segment type 126. If the entry corresponds to a video segment 62, segment type 126 further indicates whether the video segment 62 is a key frame 120 or a video sub-frame 122. Each voice segment 52 and/or video segment 62 is uniquely identified using a segment identifier 128. Each segment also includes a corresponding offset 130 (expressed in multiples of 100 milliseconds or other appropriate expression) representing a time interval measured from the beginning of the corresponding session. Offset 130 allows communication system 10 to reproduce different segments 52 and/or 62 at the appropriate time to convey the session. Also, each entry in segment table 64 includes a path identifier 202 that identifies the storage location from which components of communication system 10 can retrieve the identified segment 52 and/or 62. For example, path 202 may specify locations in databases 50 and 60, URL addresses, file transfer protocol (FTP) addresses, addresses supported by LAN 30 or PSTN 14, file pathnames, or other addressing or location information to identify and retrieve video segment 62 and communication system 10. Path identifier 202 may reflect naming conventions that identify the session, time, server, or other information regarding stored video segment 62.

Figure 5:
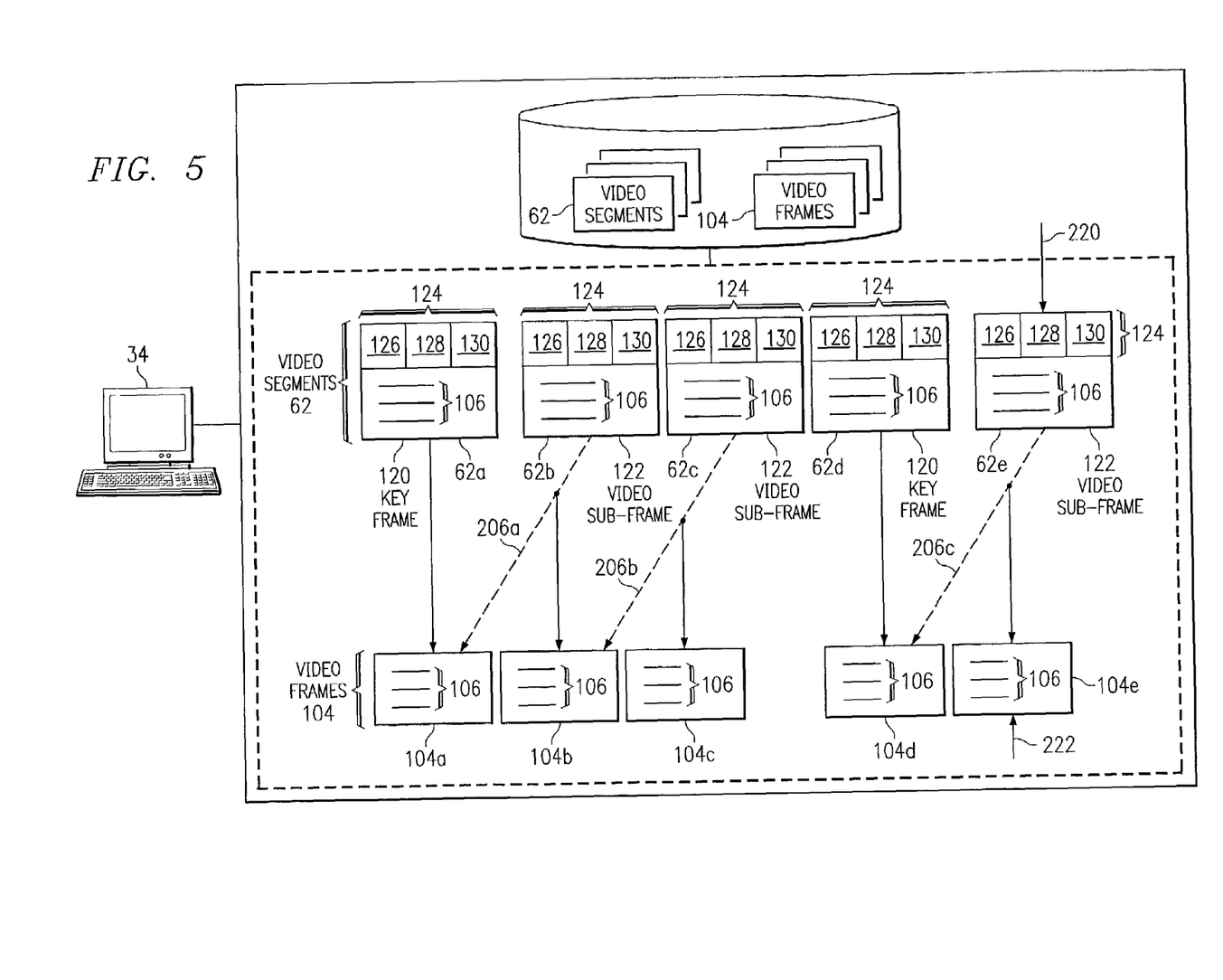
FIG. 5 illustrates one embodiment of a computer associated with a supervisor workstation of the system.

FIG. 5 illustrates one embodiment of computer 34 associated with supervisor workstation 28. Computer 34 includes a processor 200 coupled to a memory 202. In general, processor 200 comprises a central processing unit while memory 202 comprises any suitable organization of volatile or non-volatile memory that stores video segments 62 communicated by computer 32 and video frames 104 generated by processor 200 using video segments 62.

Processor 200 reproduces a particular video session by retrieving video segments 62 associated with the video session from video server 42, database 60, or any other location at which video segments 62 are stored, using, in one embodiment, path identifier 202 of video segment table 64. Processor 200 arranges video segments 62 in a particular order according to associated offsets 130 in order to reproduce different video frames 104 at the appropriate time to convey the video session. Upon retrieving and arranging video segments 62 in the appropriate order, processor 200 generates video frames 104 using video segments 62. Alternatively, processor 200 retrieves a portion of the video segments 62 of a particular video session and begins generating video frames 104 while it simultaneously retrieves other video segments 62 of the video session. In this regard, processor 200 has the flexibility to retrieve some or all of the video segments 62 of a particular video session before beginning to generate video frames 104.

Video segments 62 comprise key frames 120 and video sub-frames 122. Processor 200 generates video frames 104 using the appropriate key frames 120 and/or video sub-frames 122. For example, as the video data 106 of a key frame 120 comprises a complete image or screen dump, processor 200 uses the video data 106 of video segment 62*a* to generate video frame 104*a*. Video data 106 of video frame 104 therefore represents a complete image or screen dump.

As video segment 62*b* comprises a video sub-frame 122 having video data 106 that represents changes to the complete image of video segment 62*a*, processor 200 generates video data 106 of video frame 104*b* using video data 106*b* associated with video sub-frame 122 and video data 106 associated with video frame 104*a*. For example, the video data 106*b* in video sub-frame 122 is combined with video data 106 associated with video frame 104*a* to generate video data 106 of video frame 104*b*, as indicated using dashed arrow 206*a*. In particular, processor 200 may start with video data 106 of video segment 62*a* and substitute appropriate video pixels 150 associated with segment 62*a* with the video pixels 150 of video sub-frame 122 associated with video segment 62*b*. Therefore, the portion of video data 106 associated with segment 62*a* that remains the same from segment 62*a* to segment 62*b* is added to the video data 106 of video frame 104*b*. Moreover, the portion of video data 106 associated with segment 62*b* that represents a change from the video data 106 of segment 62*a* is also added to the video data 106 of video frame 104*b*. In this regard, video data 106 of video frame 104*b* represents a complete image or screen dump that includes portions of the complete image of video frame 104*a* as well as any intervening changes to the complete image of video frame 104*a*.

Similarly, video data 106 of video segment 62*c*, which is a video sub-frame 122, is combined with video data 106 of video frame 104*b* to generate video frame 104*c*, as indicated using dashed arrow 206*b*. In this regard, video data 106 of video frame 104*c* represents a complete image or screen dump that includes any intervening changes to the displayed information with respect to the complete image of video frame 104*b*. As video segment 62*d* comprises a key frame 120 that includes a complete image or screen dump, processor 200 uses the video data 106 of video segment 62*d* to generate video frame 104*d*. The video data 106 of video segment 62*e*, which is a video sub-frame 122, is combined with video data 106 of video frame 104*d* to generate video frame 104*e*, as indicated using dashed arrow 206*c*. In this regard, video data 106 of video frame 104*e* represents a complete image or screen dump that includes any intervening changes to the displayed information with respect to the complete image of video frame 104*d*. Although FIG. 5 is illustrated with video frames 104*a*–*e*, it should be understood that processor 200 may generate additional video frames 104 to reproduce the video session or any portion thereof.

Processor 200 stores video frames 104*a*–104*e* in a queue 210 associated with memory 202. Processor 200 then sequentially displays video frames 104 stored in queue 210, starting with video frame 104*a*, to reproduce the video session. Processor 200 generally stores a predetermined number of video frames 104 in queue 210 prior to displaying the first video frame 104*a*. In this respect, the time required to generate video frames 104 using video segments 62 generally does not delay the reproduction of the video session.

In one embodiment, processor 200 receives a command to initiate the reproduction of the video session from a particular video segment 62 associated with a particular offset 130. The command may comprise a fast forward command and/or a rewind command that causes the video session to be reproduced from a position other than the beginning of the video session. For example, the command may indicate that the video session should be reproduced from the video segment 62 indicated by arrow 220, generally referred to as the selected video segment 62. This means that the display of the video session should commence with the video frame 104 indicated by arrow 222.

To reproduce the video session starting with video segment 62*e*, for example, processor 200 identifies the appropriate key frame 120 from which the process of generating video frames 104 should begin. Generally, processor 200 identifies a key frame 120 associated with an offset 130 that is nearest to the offset 130 of the selected video segment 62 among the key frames 120 that are prior to the selected video segment 62. To generate video frame 104*e*, processor 200 therefore identifies key frame 120 associated with video segment 62*d*. Video frame 104*d* is generated using video data 106 of key frame 120 associated with video segment 62*d*. Processor 200 then combines video data 106 of video segment 62*e* with video data 106 of video frame 104*d* to generate video frame 104*e*, as indicated using dashed arrow 206*c*. Additional video frames 104 subsequent to video frame 104*e* may also be generated and stored in queue 210 using the techniques described above with reference to video frames 104*a*–104*e*. Processor 200 then initiates the reproduction of the video session by displaying video frame 104*e*, as requested by the fast forward command and/or the rewind command.

A technical advantage of the present invention is the use of key frames 120, that represent a complete image associated with a video frame 104, and video sub-frames 122 to generate video frames 104. Using key frames 120 and video sub-frames 122 processor 200 may generate video frames 104 at intermediate points of a video session rather than having to generate each video frame 104 from the beginning of the video session all the way to a position within the video session from which the reproduction of the video session is actually desired. The use of key frames 120 and video sub-frames 122 therefore facilitates an efficient and faster reproduction of the video session, and allows a particular video session to be rewinded and/or fast forwarded to a particular position in the video session.

Figure 6:
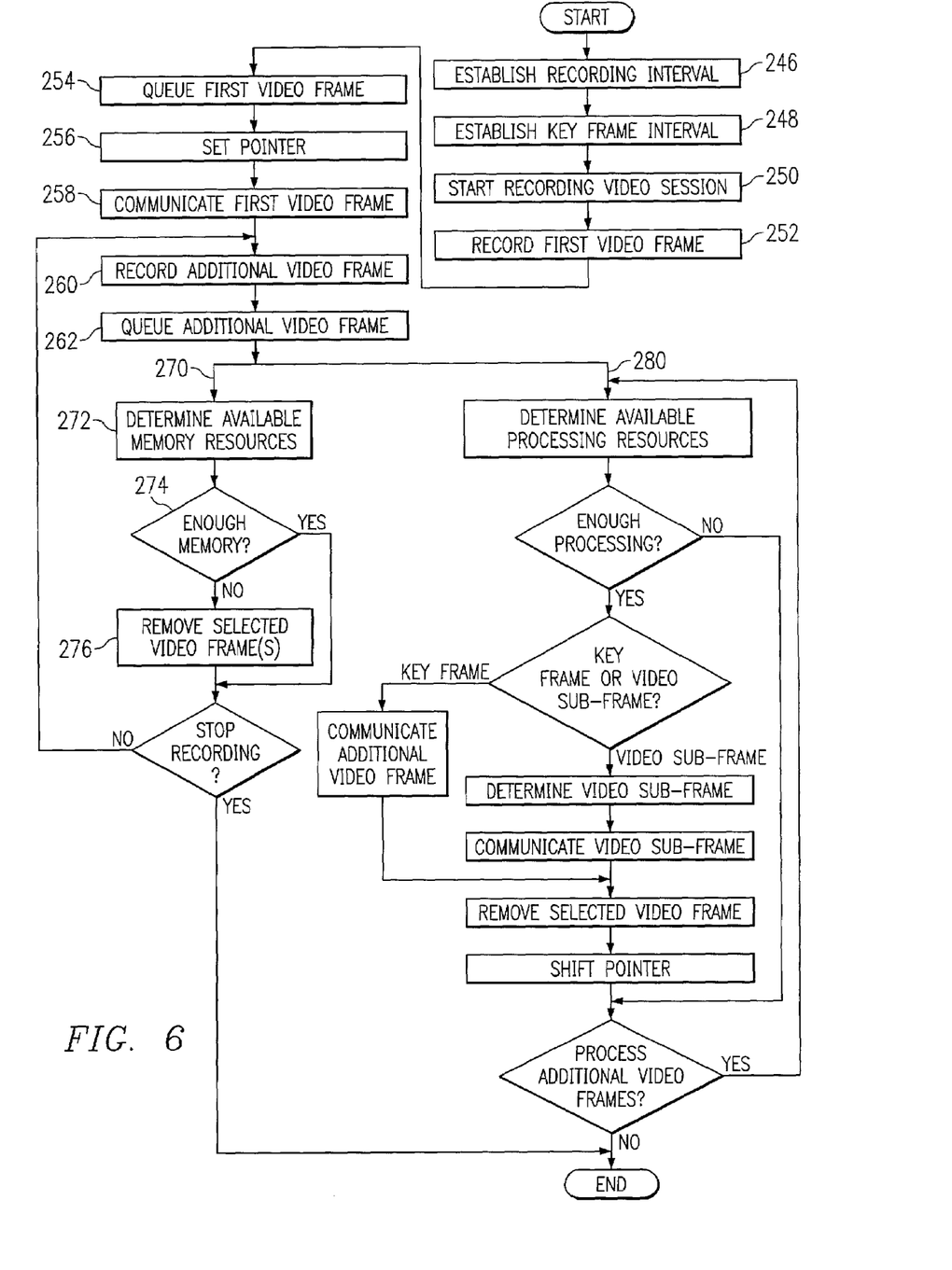
FIG. 6 is a flowchart of a method for recording a video session in the communication system.

FIG. 6 is a flowchart of a method for recording a video session in communication system 10. The method begins at step 246 where processor 100 establishes recording interval 108 in response to the determined processing capacity of processor 100. Processor 100 establishes key frame interval 136 at step 248 in response to the determined network capacity of LAN 30. As discussed above, both intervals 108 and 136 may be dynamically adjusted during a video session. Processor 100 starts recording a video session at step 250. Processor 100 records a first video frame 104 at step 252 and stores the first video frame 104 in queue 110 at step 254. Processor 100 sets a pointer associated with the first video frame 104 at step 256 and communicates the first video frame 104 to video server 42 at step 258. In one embodiment, processor 100 compresses the first video frame 104 prior to communicating it to video server 42. Processor 100 records an additional video frame 104 at step 260 and stores the additional video frame 104 in queue 110 at step 262.

Processor 100 then performs the steps associated with paths 270 and 280 simultaneously using any suitable multi-threaded processing techniques. Referring to path 270, execution proceeds to step 272 where processor 100 determines the available memory resources of computer 32. Processor 100 then determines whether the available memory resources exceeds a predetermined threshold at step 274. If not, then processor 100 determines that storing additional video frames 104 in queue 110 of memory 102 may cause processor 100 to operate in a manner that would alert the service agent that the video session is being recorded so that execution proceeds to step 276 where processor 100 removes one or more selected video frames 104 from queue 110. Upon removing one or more video frames 104 from queue 110 at step 276 or if processor 100 determines that the available memory resources of computer 32 are sufficient, as determined at step 274, execution proceeds to step 278 where processor 100 determines whether to stop recording the video session. If not, execution returns to step 260. If so, execution of path 270 terminates at step 300.

Referring to path 280, execution proceeds to step 282 where processor 100 determines the available processing resources of computer 32. At step 284, processor 100 determines whether the available processing resources of computer 32 are enough to generate video segments 62 without alerting the service agent that the video session is being recorded, such as, for example, by comparing the available processing resources with a predetermined threshold. If there is insufficient available processing resources, then processor 100 determines that processing additional video frames 104 to generate video segments 62 may cause processor 100 to generate in a manner that would alert the service agent that the video session is being recorded so that execution proceeds to step 298. If there is sufficient available processing resources, execution proceeds to step 286 where processor 100 determines whether the particular video frame 104 associated with the pointer which was set at step 256 should be a key frame 120 or a video sub-frame 122. For example, if the particular video frame 104 was recorded in response to the key frame interval 128, then no comparison of video data among video frames 104 is necessary and execution proceeds to 288 where processor 100 communicates the video frame 104 to video server 42 as a key frame 120. Otherwise, execution proceeds to step 290 where processor 100 compares the video data 106 of the appropriate video frames 104, as described in greater detail with reference to the flowchart illustrated in FIG. 7, to generate a video sub-frame 122. Processor 100 communicates video sub-frame 122 to video server 42 at step 292. In one embodiment, processor 100 comprises the video sub-frame 104 prior to communicating it to video server 42.

Processor 100 removes the video frame 104 associated with the pointer, which was originally set at step 256, at step 294. In this regard, processor 100 increases the available memory resources of computer 32 so that queue 110 may store additional video frames 104 without causing processor 100 to operate abnormally and thereby alert a service agent that the video session is being recorded. Processor 100 shifts the pointer so that it is associated with the next video frame 104 recorded by processor 100, at step 296. Execution proceeds to step 298 where processor 100 determines whether queue 110 stores additional video frames 104 for processing. If so, execution returns to step 282. If not, execution of path 280 terminates at step 300.

Figure 7:
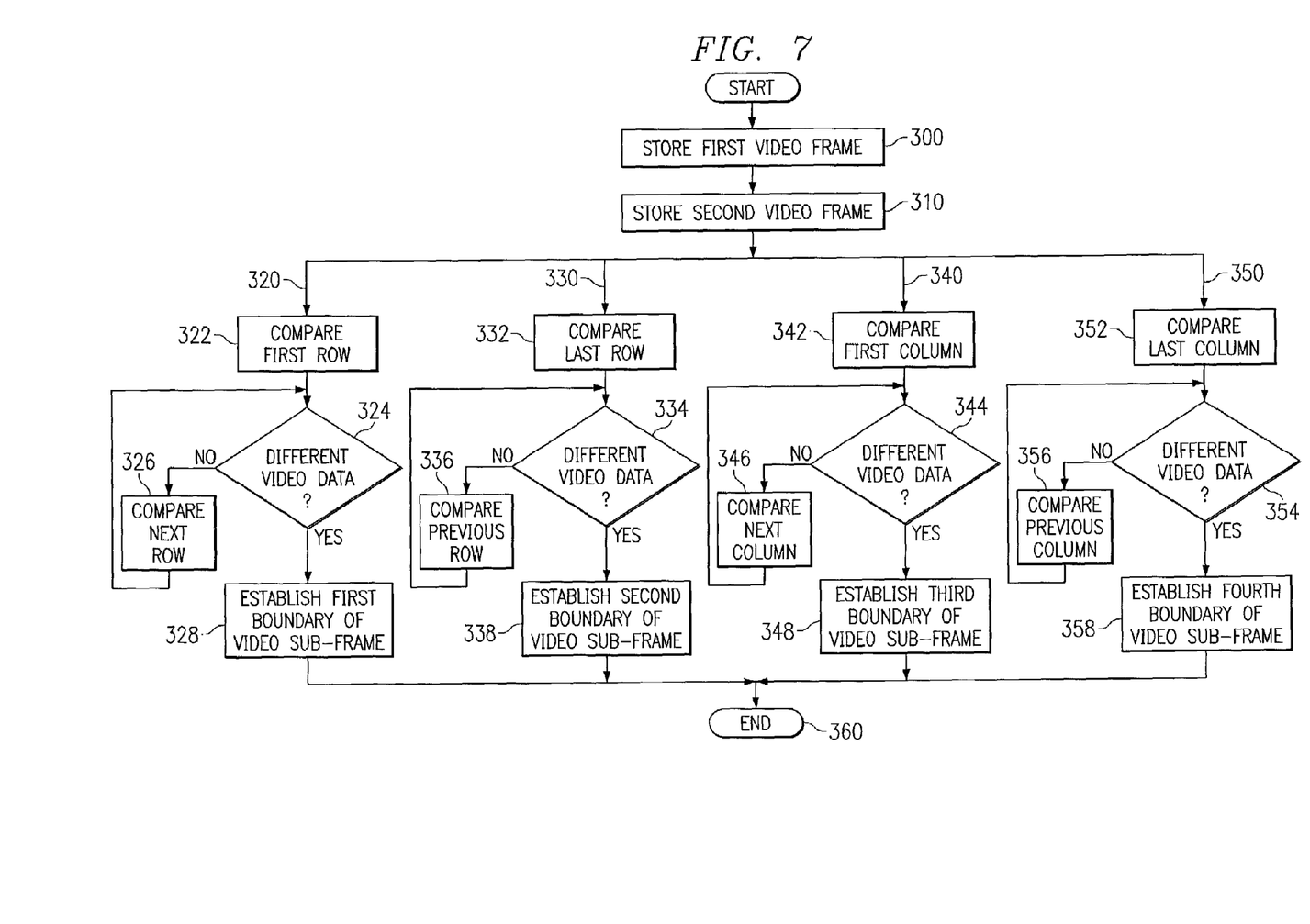
FIG. 7 is a flowchart of a method for generating a video sub-frame using a first video frame and a second video frame.

FIG. 7 is a flowchart of a method for generating a video sub-frame 122 using a first video frame 104a and a second video frame 104b. The method describes in more detail the operation of step 290 of the flowchart illustrated in FIG. 6 and begins at step 310 where processor 100 stores a first video frame 104a in queue 110. Processor 100 stores a second video frame 104b in queue 110 at step 312. Execution then proceeds to the steps associated with paths 320, 330, 340 and 350. Processor 100 generally performs the steps associated with paths 320, 330, 340, and 350 simultaneously using any suitable multi-threaded processing techniques.

Referring to path 320, processor 100 compares the first row 152 of video data 106 associated with video frame 104b with the first row 152 of video data 106 associated with video frame 104a, at step 322. Processor 100 determines whether video data 106 associated with video frame 104b is different from the video data 106 of video frame 104a at step 324. If not, execution proceeds to step 326 where processor 100 compares the next row 152 of video data 106 associated with video frame 104 with the next row 152 of video data 106 associated with video frame 104a. Execution then returns to step 324. If processor 100 determines that the video data 106 of video frame 104b is different from video data 106 of video frame 104a, as determined at step 324, execution proceeds to step 328 where processor 100 establishes the identified row 152 in which the different video data 106 is detected as a first boundary 160 of video sub-frame 122. Execution proceeds to step 360 where path 320 terminates.

Referring to path 330, processor 100 compares the last row 152 of video data 106 associated with video frame 104b with the last row 152 of video data 106 associated with video frame 104a, at step 332. Processor 100 determines whether video data 106 associated with video frame 104b is different from the video data 106 of video frame 104a at step 334. If not, execution proceeds to step 336 where processor 100 compares the previous row 152 of video data 106 associated with video frame 104 with the previous row 152 of video data 106 associated with video frame 104a. Execution then returns to step 334. If processor 100 determines that the video data 106 of video frame 104b is different from video data 106 of video frame 104a, as determined at step 334, execution proceeds to step 338 where processor 100 establishes the identified row 152 in which the different video data 106 is detected as a second boundary 160 of video sub-frame 122. Execution proceeds to step 360 where path 330 terminates.

Referring to path 340, processor 100 compares the first column 154 of video data 106 associated with video frame 104b with the first column 154 of video data 106 associated with video frame 104a, at step 342. Processor 100 determines whether video data 106 associated with video frame 104b is different from the video data 106 of video frame 104a at step 344. If not, execution proceeds to step 346 where processor 100 compares the next column 154 of video data 106 associated with video frame 104 with the next column 154 of video data 106 associated with video frame 104a. Execution then returns to step 344. If processor 100 determines that the video data 106 of video frame 104b is different from video data 106 of video frame 104a, as determined at step 344, execution proceeds to step 348 where processor 100 establishes the identified column 154 in which the different video data 106 is detected as a third boundary 160 of video sub-frame 122. Execution proceeds to step 360 where path 340 terminates.

Referring to path 350, processor 100 compares the last column 154 of video data 106 associated with video frame 104b with the last column 154 of video data 106 associated with video frame 104a, at step 352. Processor 100 determines whether video data 106 associated with video frame 104b is different from the video data 106 of video frame 104a at step 354. If not, execution proceeds to step 356 where processor 100 compares the previous column 154 of video data 106 associated with video frame 104 with the previous column 154 of video data 106 associated with video frame 104a. Execution then returns to step 354. If processor 100 determines that the video data 106 of video frame 104b is different from video data 106 of video frame 104a, as determined at step 354, execution proceeds to step 358 where processor 100 establishes the identified column 154 in which the different video data 106 is detected as a fourth boundary 160 of video sub-frame 122. Execution proceeds to step 360 where path 350 terminates.

Figure 8:
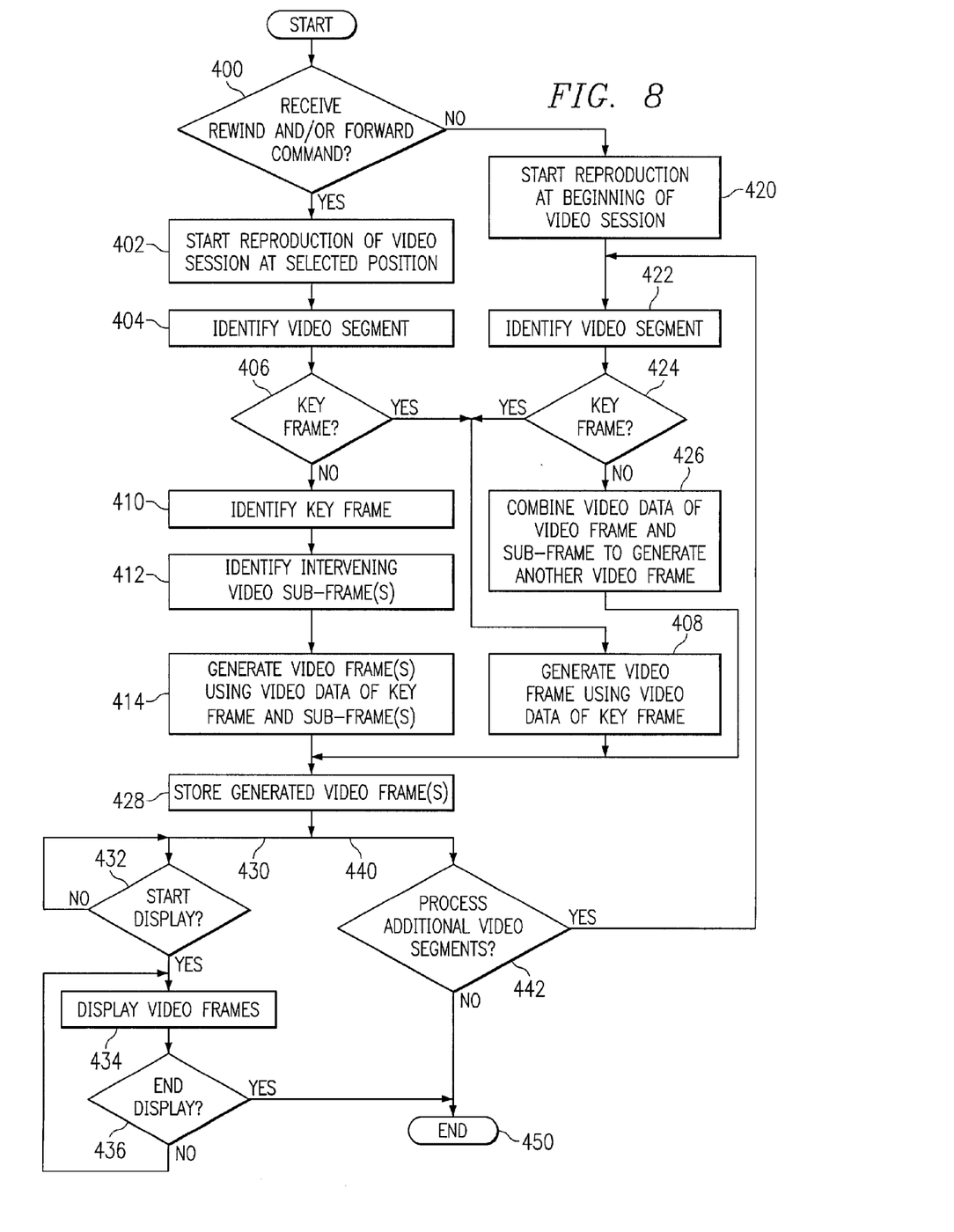
FIG. 8 is a flowchart of a method for reproducing a video session in the communication system.

FIG. 8 is a flowchart of a method for reproducing a video session in communication system 10. The method begins at step 400 where processor 200 determines whether a rewind and/or forward command has been received. Such a command instructs processor 200 to initiate the reproduction of the video session from a particular video segment 62 associated with a particular offset 130. If such a command is received, as determined at step 400, execution proceeds to step 402 where processor 200 starts the reproduction of the video session at the selected position within the video session. Processor 200 identifies the appropriate video segment 62 identified by the command, at step 404. Processor 200 determines whether the identified video segment 62 comprises a key frame 120 at step 406. If so, execution proceeds to step 408 where processor 200 generates a video frame 104 using the video data 106 of the key frame 120 because the video data 106 of a key frame 120 generally comprises a complete image or screen dump. Execution then proceeds to step 428.

If the video segment 62 is not a key frame 120, as determined at step 406, execution proceeds to step 410 where processor 200 identifies an appropriate key frame 120. In particular, processor 200 identifies a key frame 120 associated with an offset 130 that is nearest to the offset 130 of the selected video segment 62 among the key frames 120 that are prior to the selected video segment 62. Processor 200 then identifies the intervening video sub-frames 122, at step 412. The intervening video sub-frames 122 comprise the video sub-frames 122 between the key frame 120 identified at step 410 and the video segment 62 identified at step 404. Processor 200 generates one or more video frames 104 at step 414 using the video data 106 of the key frame 120 identified at step 410 and the intervening video sub-frames 122 identified at step 412, as described above with reference to FIG. 5. Execution then proceeds to step 428.

If a rewind and/or forward command was not received, as determined at step 400, execution proceeds to step 420 where processor 200 starts the reproduction of the video session at the beginning of the video session. Processor 200 identifies an appropriate video segment 62 to process at step 422, and determines whether the video segment 62 is a key frame 120 at step 424. If so, execution proceeds to step 408 where processor 200 generates a video frame 104 using the video data 106 of the key frame 120 identified at steps 422 and 424. Execution then proceeds to step 428 from step 408. If the video segment 62 identified at step 422 does not comprises a key frame 120, as determined at step 424, execution proceeds to step 426 where processor 200 combines the appropriate video data 106 of the appropriate video frame 104 and video sub-frame 122 to generate another video frame 104, as described above with reference to FIG. 5.

Execution proceeds to step 428 where processor 200 stores one or more generated video frames 104 in queue 210. Processor 200 then performs the steps associated with paths 430 and 440 simultaneously using any suitable multi-threaded processing techniques. Referring to path 430, execution proceeds to step 432 where processor 200 determines whether to start the display of video frames 104. In one embodiment, processor 200 determines whether a sufficient number of video frames 104 have been generated and stored in queue 210. Eventually, execution proceeds to step 434 where processor 200 displays video frames 104 in an appropriate arrangement as determined by offsets 130 associated with video segments 62. Execution proceeds to step 436 where processor 200 determines whether to end the display of the video session. Upon ending the display, execution proceeds to step 450 where path 430 terminates execution. Referring to path 440, processor 200 determines whether to process additional video segments 62 at step 442. If additional video segments 62 are to be processed, execution returns to step 422. If not, execution proceeds to step 450 where path 440 terminates execution.

Although the present invention has been described with several embodiments, a myriad of changes, variations, alterations, transformations, and modifications may be suggested to one skilled in the art, and it is intended that the present invention encompasses such changes, variations, alterations, transformations, and modifications as fall within the spirit and scope of the appended claims.

What is claimed is:

1. A method for reproducing a video session, comprising:
storing a first video frame that includes first video data;
storing a first video sub-frame comprising second video data that is different from the first video data;

generating a second video frame using the first video frame and the first video sub-frame;
storing a second video sub-frame comprising third video data that is different from the video data of the second video frame;
generating a third video frame using the second video frame and the second video sub-frame;
storing a fourth video frame comprising fourth video data;
storing a third video sub-frame comprising fifth video data that is different from the fourth video data;
generating a fifth video frame using the fourth video frame and the third video sub-frame;
wherein each of the first video frame and the fourth video frame are generated using a corresponding key frame, each key frame is associated with a time interval, and each video sub-frame is associated with a time interval subsequent to the time interval of at least one key frame, the method further comprising:
receiving a command to initiate reproduction of the video session from a particular video sub-frame associated with a selected time interval;
determining a key frame associated with a time interval that is prior to the selected time interval;
generating a video frame using at least the determined key frame and the particular video sub-frame; and displaying the generated video frame.

2. The method of claim 1, further comprising generating a predetermined number of video frames for storage in a queue prior to displaying the first video frame.

3. The method of claim 1, wherein:
the particular video sub-frame comprises the third video sub-frame; and
the determined key frame comprises the fourth video frame.

4. The method of claim 1, further comprising determining a video sub-frame associated with a time interval between the time interval of the determined key frame and the selected time interval, wherein the step of generating comprises generating the video frame using the determined key frame, the particular video sub-frame, and the determined video sub-frame.

5. The method of claim 4, wherein:
the particular video sub-frame comprises the second video sub-frame;
the determined key frame comprises the first video frame; and
the determined video sub-frame comprises the first video sub-frame.

6. The method of claim 1, wherein the time interval of the determined key frame is nearest to the selected time interval among the time intervals of key frames that are prior to the selected time interval.

7. The method of claim 1, wherein the command comprises a fast-forward command.

8. The method of claim 1, wherein the command comprises a rewind command.

9. The method of claim 1, wherein displaying is synchronized with the reproduction of a voice session associated with the video session.

10. A client for reproducing a video session, comprising:
a memory operable to store a first video frame that includes first video data, a first video sub-frame comprising second video data that is different from the first video data, a second video sub-frame comprising third video data, a fourth video frame comprising fourth video data, and a third video sub-frame comprising fifth video data that is different from the fourth video data; and
a processor coupled to the memory and operable to:
generate a second video frame using the first video frame and the first video sub-frame, wherein the third video data is different from the video data of the second video frame;
generate a third video frame using the second video frame and the second video sub-frame;
generate a fifth video frame using the fourth video frame and the third video sub-frame;
wherein each of the first video frame and the fourth video frame are generated using a corresponding key frame, each key frame is associated with a time interval, and each video sub-frame is associated with a time interval subsequent to the time interval of at least one key frame, the processor further operable to:
receive a command to initiate reproduction of the video session from a particular video sub-frame associated with a selected time interval;
determine a key frame associated with a time interval that is prior to the selected time interval;
generate a video frame using at least the determined key frame and the particular video sub-frame; and
display the generated video frame.

11. The client of claim 10, wherein the memory is further operable to store a predetermined number of video frames in a queue and the processor is further operable to display a portion of the video frames stored in the queue.

12. The client of claim 10, wherein:
the particular video sub-frame comprises the third video sub-frame; and
the determined key frame comprises the fourth video frame.

13. The client of claim 10, wherein the processor is further operable to:
determine a video sub-frame associated with a time interval between the time interval of the determined key frame and the selected time interval; and
generate the video frame using the determined key frame, the particular video sub-frame, and the determined video sub-frame.

14. The client of claim 13, wherein:
the particular video sub-frame comprises the second video sub-frame;
the determined key frame comprises the first video frame; and
the determined video sub-frame comprises the first video sub-frame.

15. The client of claim 10, wherein the time interval of the determined key frame is nearest to the selected time interval among the time intervals of key frames that are prior to the selected time interval.

16. The client of claim 10, wherein the command comprises a fast-forward command.

17. The client of claim 10, wherein the command comprises a rewind command.

18. The client of claim 10, wherein the processor is further operable to synchronize the display of the first video frame with the reproduction of a voice session associated with the video session.

19. A method for reproducing a video session, comprising:
storing a plurality of video frames;
storing a plurality of video sub-frames;

wherein at least a portion of the video frames are associated with a corresponding key frame, each key frame is associated with a time interval, and each video sub-frame is associated with a time interval subsequent to the time interval of at least one key frame, the method further comprising:

receiving a command to initiate reproduction of the video session from a particular video sub-frame associated with a selected time interval;

determining a key frame associated with a time interval that is prior to the selected time interval;

generating a video frame using at least the determined key frame and the particular video sub-frame; and displaying the generated video frame.

20. The method of claim 19, further comprising determining a video sub-frame associated with a time interval between the time interval of the determined key frame and the selected time interval, wherein the step of generating comprises generating the video frame using the determined key frame, the particular video sub-frame, and the determined video sub-frame.

21. The method of claim 19, wherein the time interval of the determined key frame is nearest to the selected time interval among the time intervals of key frames that are prior to the selected time interval.

22. The method of claim 19, wherein the command comprises a fast-forward command.

23. The method of claim 19, wherein the command comprises a rewind command.

24. The method of claim 19, wherein displaying is synchronized with the reproduction of a voice session associated with the video session.

* * * * *